3,465,659
CARTRIDGE CONTROL MEANS ASSOCIATED
WITH A HINGE-TYPE CAMERA LID
Akihiko Sato, Tokyo, Japan, assignor to Nippon Kogaku
K.K., Tokyo, Japan, a corporation of Japan
Filed Sept. 13, 1966, Ser. No. 579,154
Claims priority, application Japan, Sept. 22, 1965,
40/77,345
Int. Cl. G03b 19/04
U.S. Cl. 95—31     3 Claims

ABSTRACT OF THE DISCLOSURE

A film cartridge control device for retaining the cartridge in a predetermined position within the camera body. The control device is adapted to engage the film cartridge so that even when the photographers fingers are removed from the cartridge, rotation of the film cartridge within the camera body is prevented.

---

This invention relates to film cartridge control means associated with a hinge-type camera lid.

In inserting a cartridge into a camera, the tension and feed of the film deteriorate when hand is removed from the cartridge before the lid of the camera is closed as the cartridge is rotated because of the curl of the film.

According to the conventional methods, the front end of the film is inserted in or fixed to the take-up spool and after positioning the cartridge and adjusting the feed and tension of the film, the lid of the camera is closed. Such an arrangement has been for the most part trouble-free, the camera lid being provided with a plate spring or the like to prevent the shifting and misalignment of the film cartridge upon rewinding.

However, in the case of the automatic winding type cameras which have recently been developed, before the front end of a film is wound up on the winding spool, the user's hand is removed from the cartridge and the lid is closed. There is a drawback that the stability of a cartridge becomes deteriorated.

The object of the present invention is to prevent the above mentioned defects.

In accordance with the present invention, a cartridge control means in a camera having a film chamber and a film rewinding shaft is presented which comprises providing a member on the camera body, the lower portion of which passes into or out of the film spool chamber to abut a flat outer surface portion provided on film cartridge, the abutting member being interlocked with the film rewinding shaft and movable therewith to engage and disengage the surface portion provided on the cartridge.

The present invention will be better understood by the following description with reference to the illustrative embodiment of the present invention shown in the accompanying drawing in which.

Figure 1:
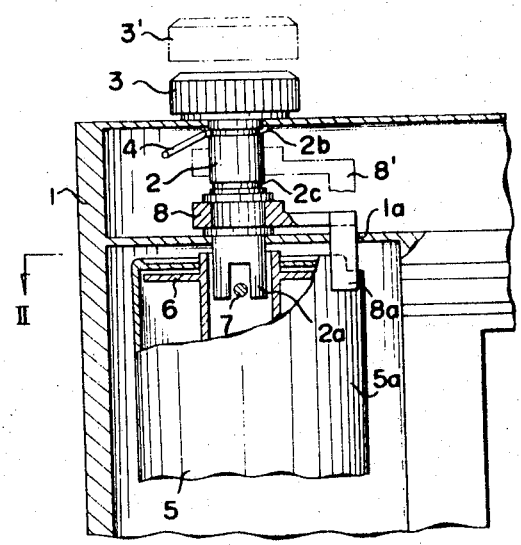
FIG. 1 shows an embodiment in accordace with the present invention.
Figure 2:
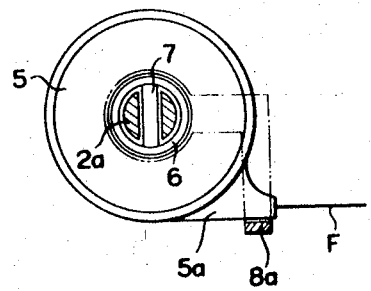
FIG. 2 is a drawing as viewed from the direction of an arrow II in FIG. 1.

In the drawing, 1 is a camera body, 2 is a film rewinding shaft provided rotatably and movably on the said camera body 1, the end portion of the shaft 2 being bifurcated as at 2a. The film rewinding shaft 2 is provided with a rewinding knob 3 intergrally formed therewith, and formed with two spaced peripheral grooves 2b and 2c which act in conjunction with a spring 4 as a detent for determining the raised and lowered position of the shaft; the spring 4 also serving to provide a frictional resistance to the movement of the shaft. A film cartridge 5 is disposed within the film spool chamber of the camera, and 6 is a spool contained in the said cartridge 5. A transversely disposed pin 7 is provided on the film spool 6 carrying the film F, the pin 7 being adapted to be engaged by the bifurcated end 2a of the shaft 2. In accordance with the present invention, a control member 8 provided with the downwardly bent portion 8a at the lower portion thereof, is rotatably fitted to the shaft 2, and at the same time it is so devised as to move up and down with the said rewinding shaft 2, and the said bent portion 8a is slidably inserted into a rectangular hole 1a provided on the camera body. The film cartridge 5 is formed with a feed guide for the film F in the form of a projection 5a having a flat portion tangential to the cartridge. With the film rewinding knob depressed, the control member portion 8a passes through an opening 1a in the camera body and abuts the flat portion of the cartridge projection 5a. It will also be noted that the notch formed by the bifurcated end 2a of the shaft 2 engages the pin 7 of the film spool 6. With the rewinding knob 3 in the upper position 3', the winding shaft 2 is disconnected from the film spool and the control member portion 8a is withdrawn to permit removal (or insertion) of the film cartridge. On the other hand, with the knob 3 in its lowermost position, the film spool 6 is engaged via the pin 7 with the rewinding shaft 2 and the film cartridge is held in its predetermined position within the film chamber of the camera thus permitting rotation of the shaft 2 while the film cartridge is held stationary.

As explained above, when the present invention is employed, even if the user's hand is removed from the cartridge, the rotation of the cartridge itself caused by the curling of film can be prevented, and therefore the device of the present invention is very effective in the case of cameras having automatic film winding means. On the other hand, the device of this invention effectively works at the time of rewinding, and therefore it is not necessary to provide a special member as in conventional devices.

What is claimed is:

1. A cartridge control means for a roll film camera, the combination comprising:
    a camera housing having a film chamber,
    a film spool within said cartridge
    a rewinding shaft having a rewinding knob for the camera film chamber, said rewinding shaft being rotatably mounted and axially movable between upper and lower extreme positions on the camera body,
    means for interconnecting the rewinding shaft and the film spool in the lower axial position of the shaft,
    a flat portion formed on the film cartridge,
    a control member rotatably mounted on the rewinding shaft and axially movable therewith, and
    a dependent abutting portion on said control member adapted to abut the flat portion of the film cartridge when the rewinding shaft is in its lower extreme position to prevent rotation of the film cartridge, the abutting portion being withdrawn and the spool interconnecting means being disconnected when the rewinding shaft is in its upper extreme position to permit removal of the film cartridge from the film chamber of the camera.

2. A cartridge control means as set forth in claim 1, wherein the camera body is formed with an opening registering with the film chamber of the camera and the dependent abutting portion passes through the opening into the chamber to abut the flat portion of the film cartridge.

3. A cartridge control as set forth in claim 1, wherein the rewinding shaft is formed with two spaced peripheral grooves, and
 a resilient member fixed in the camera body and cooperating with the rewinding shaft to impart frictional retardation for the shaft and to serve as a stop in conjunction with the two grooves to limit the axial movement of the shaft to the upper and lower extreme positions.

References Cited

UNITED STATES PATENTS 3,106,142   10/1963   Peterson _____ 95—31

NORTON ANSHER, Primary Examiner

J. F. PETERS, JR., Assistant Examiner